US006768045B1

(12) United States Patent
Ellis

(10) Patent No.: US 6,768,045 B1
(45) Date of Patent: Jul. 27, 2004

(54) PRACTICE APPLIANCE

(76) Inventor: Samuel J. Ellis, 1357 E. Salem Pike, Marion, IN (US) 46952

( * ) Notice: Subject to any disclaimer, the term of this patent is extended or adjusted under 35 U.S.C. 154(b) by 0 days.

(21) Appl. No.: 10/242,654

(22) Filed: Sep. 12, 2002

(51) Int. Cl.[7] ............................................... G09B 15/06
(52) U.S. Cl. ............................. 84/465; 84/466; 84/453; 84/398; 84/387 R; 84/399; 84/387 A
(58) Field of Search ......................... 84/465, 466, 453, 84/398, 387 R, 399, 387 A

(56) References Cited

U.S. PATENT DOCUMENTS

| 3,659,489 | A | * | 5/1972 | Vale | 84/465 |
| 4,012,983 | A | * | 3/1977 | Ploeger | 84/400 |
| 4,120,228 | A | * | 10/1978 | Windows, Jr. | 84/453 |
| 4,378,724 | A | * | 4/1983 | Lamart | 84/465 |
| 6,080,924 | A | * | 6/2000 | Cowen et al. | 84/453 |

* cited by examiner

Primary Examiner—Shih-Yung Hsieh
(74) Attorney, Agent, or Firm—Krieg DeVault Lundy LLP

(57) ABSTRACT

A new and improved sound reflector and a mouthpiece mount. The mouthpiece mount is secured to the sound reflector to position a mouthpiece adjacent to and generally perpendicular of the reflector.

21 Claims, 3 Drawing Sheets

PRACTICE APPLIANCE

BACKGROUND OF THE INVENTION

The present invention relates to a new and improved practice appliance, and more particularly to a practice appliance for use by brass players in practicing their instruments away from a band and without an instrument.

It has long been known that musicians who play brass instruments such as the trumpet, the tuba, the baritone, the French horn and the trombone, herein referred to as "brass players," must practice regularly to maintain their competence. The lip that provides all of the vibration and tonal quality of a brass instrument must be maintained in physical condition. Further, brass players must, from time to time, practice tonguing techniques to maintain top quality.

For years, brass players have carried their mouthpieces with them, and during times such as driving on the interstate and at other times when at least one hand is free and they can concentrate, buzz their mouthpieces in an attempt to maintain their proficiency on the instrument.

However, in many places, brass players have difficulty in hearing the buzz of the mouthpiece so as to be able to properly practice and to concentrate on improving their skills. It is therefore highly desirable to provide a new and improved practice appliance for brass players.

Any practical practice appliance for a brass player must enhance the sound of the mouthpiece being buzzed. Such an appliance must amplify the sound such that one can distinguish the tonal quality of the buzz and the tonguing of the buzz. Additionally, the appliance should be small, portable and hand-held such that this can be accomplished in all locations, even while driving. It is therefore highly desirable to provide a new and improved practice appliance for brass players that is relatively small, portable and hand-held. It is also highly desirable to provide a new and improved practice appliance for brass players that amplifies the mouthpiece buzz such that tonal quality and tonguing can be easily heard.

Most brass players, when a practice appliance is not being used, carry it in a coat or trouser pocket. Thus, the practice appliance must not be cumbersome. It would also be highly useful in order to store the mouthpiece with the appliance. Therefore, it is highly desirable to provide a new and improved practice appliance for brass players that is small enough and lightweight enough to be carried in a pocket of one's clothing. It is also highly desirable to provide a new and improved practice appliance by which the mouthpiece can be stored when not in use.

Since any practice appliance is an accessory to any brass player, the appliance should be relatively inexpensive and convenient to use. Therefore, it is highly desirable to provide a new and improved practice appliance for brass players that is relatively inexpensive to manufacture. It is also highly desirable to provide a new and improved practice appliance for brass players that is convenient to use.

Finally, it is highly desirable to provide a new and improved practice appliance for brass players that has all of the features above.

SUMMARY OF THE INVENTION

It is an object of the invention to provide a new and improved practice appliance for brass players.

It is also an object of the invention to provide a new and improved practice appliance for brass players that is relatively small, portable and hand-held.

It is also an object of the invention to provide a new and improved practice appliance for brass players that amplifies the mouthpiece buzz such that tonal quality and tonguing can be easily heard.

It is also an object of the invention to provide a new and improved practice appliance for brass players that is small enough and lightweight enough to be carried in a pocket of one's clothing.

It is also an object of the invention to provide a new and improved practice appliance by which the mouthpiece can be stored when not in use.

It is also an object of the invention to provide a new and improved practice appliance for brass players that is relatively inexpensive to manufacture.

It is also an object of the invention to provide a new and improved practice appliance for brass players that is convenient to use.

Finally, it is an object of the invention to provide a new and improved practice appliance for brass players that has all of the features above.

In the broader aspects of the invention, there is provided a new and improved sound reflector and a mouthpiece mount. The mouthpiece mount is secured to the sound reflector to position a mouthpiece adjacent to and generally perpendicular of the reflector.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figures 1, 2:
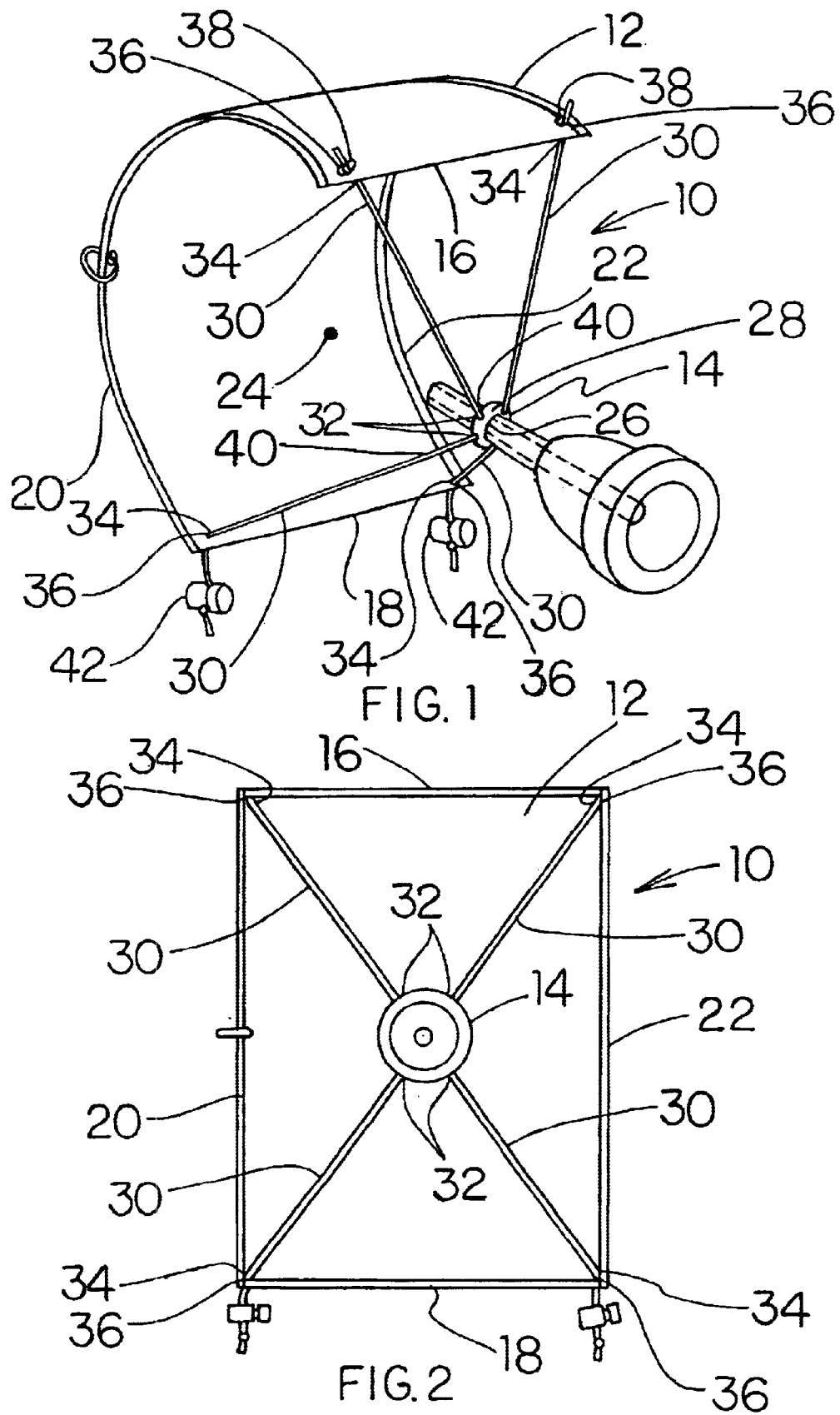
FIG. 1 is a perspective view showing a flexible version of the new and improved practice appliance of the invention with a mouthpiece secured to the mouthpiece mount.
FIG. 2 is a front view thereof.

The new and improved practice appliance 10 of the invention includes two major parts. The first part of appliance 10 is a reflector 12, the second major part of the appliance 10 is the mouthpiece mount 14.

Reflector 12 is a sound reflector having opposite ends 16, 18 and opposite sides 20, 22. In specific embodiments, reflector 12 may be of a sound reflector material cast into a concave reflector shape as shown in the figures. In other embodiments, the reflector 12 may be of a sheet of resilient sound reflector material which may be resiliently held in a concave reflector shape. The specific dimensions of the reflector i.e. length and width of the reflector may depend upon dimensions of a specific mouthpiece for which it is designed, as will be mentioned hereinafter. In all embodiments, the reflector 12 is made of a reflector material i.e. material that can pick up the vibrations produced by a mouthpiece and reflect them back towards the person playing the mouthpiece. The opposite of "reflector material" is "sound absorbing material". In all embodiments, the reflector is of a concave shape having a focus 24 shown in FIG. 3. The focus 24 is defined as the position at which parallel sound is focused.

Mouthpiece mount 14 is a rigid ring having an opening 26 therein in which the mouthpiece may be inserted and secured by friction. The opening may have cylindrical walls as most mouthpieces have a tapered cylindrical exterior surface such that the mouthpiece can be placed in the opening and bound thereto by friction. Mouthpiece mount 14 has a body portion 28 surrounding the centrally located opening 26 providing a rigid support to a mouthpiece. By this means a mouthpiece may be secured to the reflector 12 outwardly of the focus 24 of the reflector 12. In the specific embodiments disclosed, the mouthpiece mount is secured to the reflector 12 by a plurality of support arms 30. Support arms 30 each have opposite ends 32, 34, one end 32 of which is secured to the mouthpiece mount 14 with the other end 34 secured to the periphery of the reflector 12. In a specific embodiment in which the reflector 12 is rigid, support arms 30 are each rigid.

Figure 3:
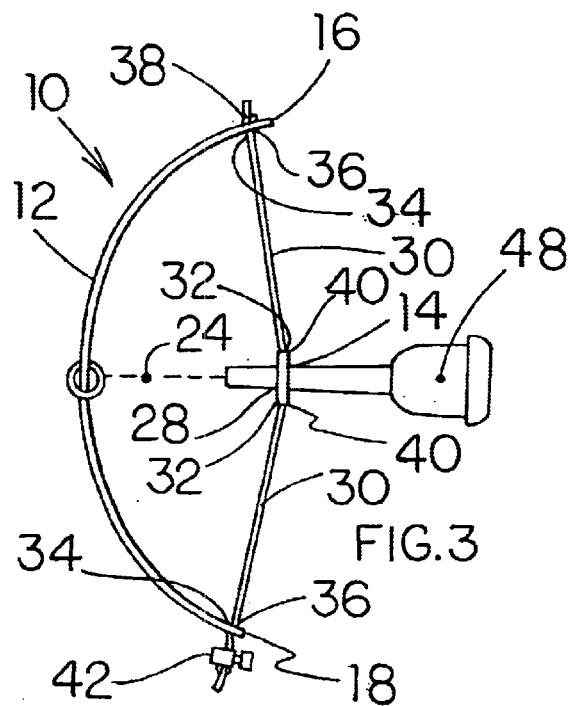
FIG. 3 is a side view thereof.

In another specific embodiment in which the reflector 12 is a flexible and resilient sheet of reflector material, the support arms 30 are flexible and secured to both the mouthpiece mount 14 and the periphery of the reflector 12. In this embodiment, the resiliency of the reflector 12 will maintain the support arms 30 in an extended taut condition as shown in FIGS. 1 through 3.

In another specific embodiment having a resilient and flexible reflector 12, each of the support arms 30 are chords threaded through openings 36 in the reflector 12 at the periphery thereof, and secured thereto by a knot 38. The support arms 30 are also threaded through openings 40 in the body 28 of the mouthpiece mount 14 and are secured by sliding cord locks 42. In this manner, the shape of the reflector 12 may be altered as desired and the mouthpiece mount 14 positioned outwardly of the focus of the reflector as desired.

In still another specific embodiment, the reflector 12, the support arms 30 and the mouthpiece mount are all formed of rigid material.

In still another embodiment, the reflector 12 may be part spherical. The concave surface may be chosen from the group of concave surfaces consisting of part concaved, part spherical surfaces and part parabolic surfaces. The center of rotation of the concave surface 48 is shown in FIG. 3.

The mouthpieces which can be mounted in a mouthpiece mount and utilized with the reflector 12 vary in size. The tuba mouthpiece is generally about 3.5 inches long, about 0.5 inches in diameter at the small end and about 0.75 inches in diameter at the large end. A trombone mouthpiece is about 3 inches long, about 0.375 inches in diameter at the small end and about 1.50 inches in diameter at the large end. A trumpet is about 3½ inches long, about 0.375 inches in diameter at the small end and about 1 inch in diameter at the large end. A French horn mouthpiece is about 3 inches long, about 0.375 inches in diameter at the small end and about 1 inch in diameter at the large end. A baritone mouthpiece is about 3 inches long, about 0.375 inches in diameter at the small end and about 1.5 inches in diameter at the large end.

Each of these mouthpieces can be utilized with the reflector 12 and be mounted in position outwardly of the focus 24 of the reflector 12 by the mount 14. In a specific embodiment, the opening of the mount is from about 0.4 to about 0.5 inches in diameter.

Figure 4:
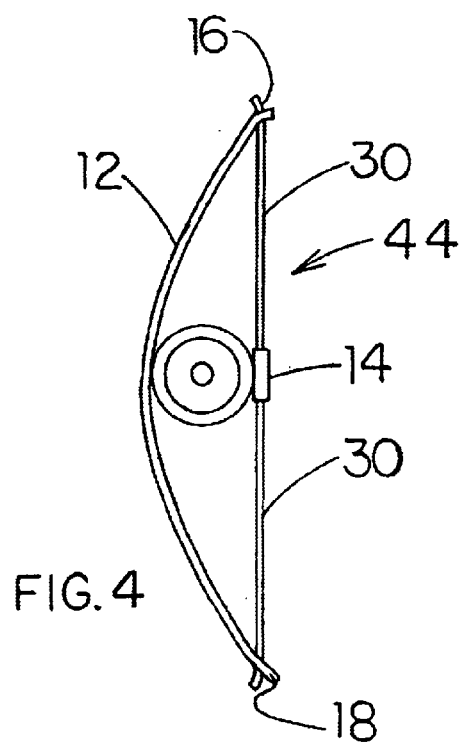
FIG. 4 is a side view of a rigid version of the new and improved practice appliance of the invention expanded to store a mouthpiece between the sound reflector and the support arms.

In one version of the reflector 12, the mouthpiece and the reflector 12 are separate pieces which when not in use are stored separately. In other versions of the reflector 12, the mouthpiece can be stored with the reflector 12 when not in use. Two storage positions are available. The first 44 is between the reflector 12 and the support arms 30. The mouthpiece is inserted so as to extend transversely of the longitudinal length of the reflector 12 as shown in FIG. 4. The mouthpiece is held in position frictionally between the reflector 12 and the support arms 30. In this embodiment, it is clearly important that the mouthpiece support and the reflector 12 are spaced apart a distance less than the diameter of the larger portion of the mouthpiece.

Figure 5:
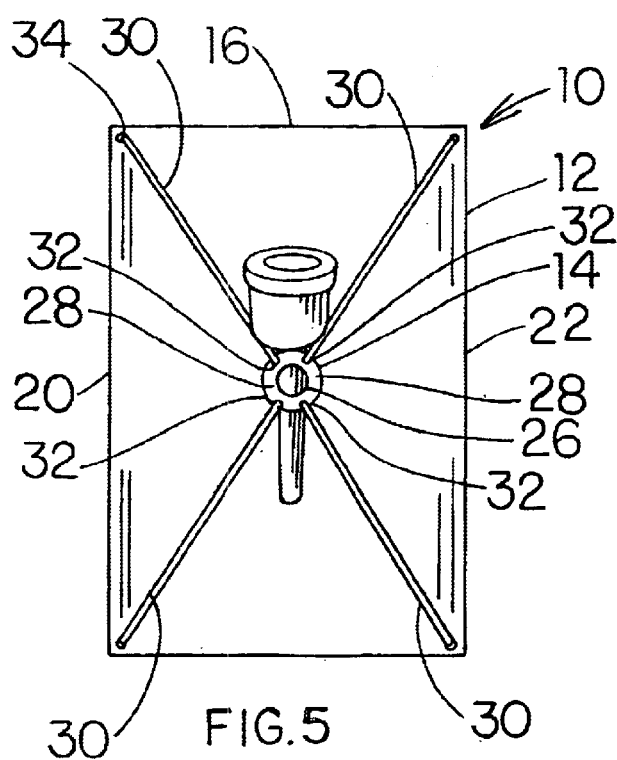
FIG. 5 is a front view of a rigid version of the new and improved practice appliance of the invention showing a mouthpiece stored in the appliance between the support arms.
Figure 6:
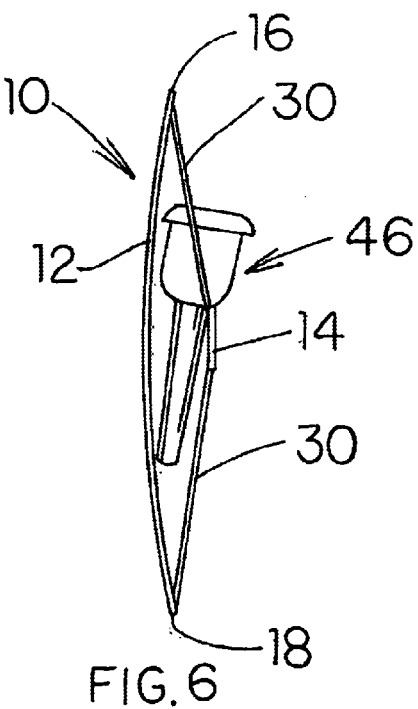
FIG. 6 is a side view of the new and improved practice appliance shown in FIG. 5.

A second storage position 46 is accomplished between the support arms 30 of the mouthpiece. In this embodiment, the width of the reflector 12 is chosen such that the support arms 30 are spaced apart a distance which will frictionally hold the mouthpiece therebetween. The mouthpiece is inserted beneath the mouthpiece mount 14 and between the support arms so as to be frictionally held between the reflector 12 and the support arm 30 as shown in FIGS. 5 and 6. In a specific embodiment in which a trumpet mouthpiece can be held between support arms 30, the reflector 12 is about 3 inches long and about 2.5 inches wide and has a concave curvature. The support arms 30 are from about 1.5 inches to about 3 inches long. The mouthpiece mount 14 is a disk having an exterior diameter of about 0.75 inches, opening 26 has a diameter of about 0.375 to about 0.625 inches and an axial dimension of about 0.25 inches to about 0.5 inches.

In a specific embodiment in which the mouthpiece is stored between the mouthpiece and the reflector 12 the support arms at the center of the reflector are spaced from reflector 12 from about 30% to about 70% of the maximum diameter of the mouthpiece.

In a specific embodiment in which the mouthpiece is stored between the support arms 30, the width of the reflector 12 is such that the distance between the support arms at ends 16, 18 is approximately 0.75% to about 200% of the maximum diameter of the mouthpiece to be stored.

Figure 7:
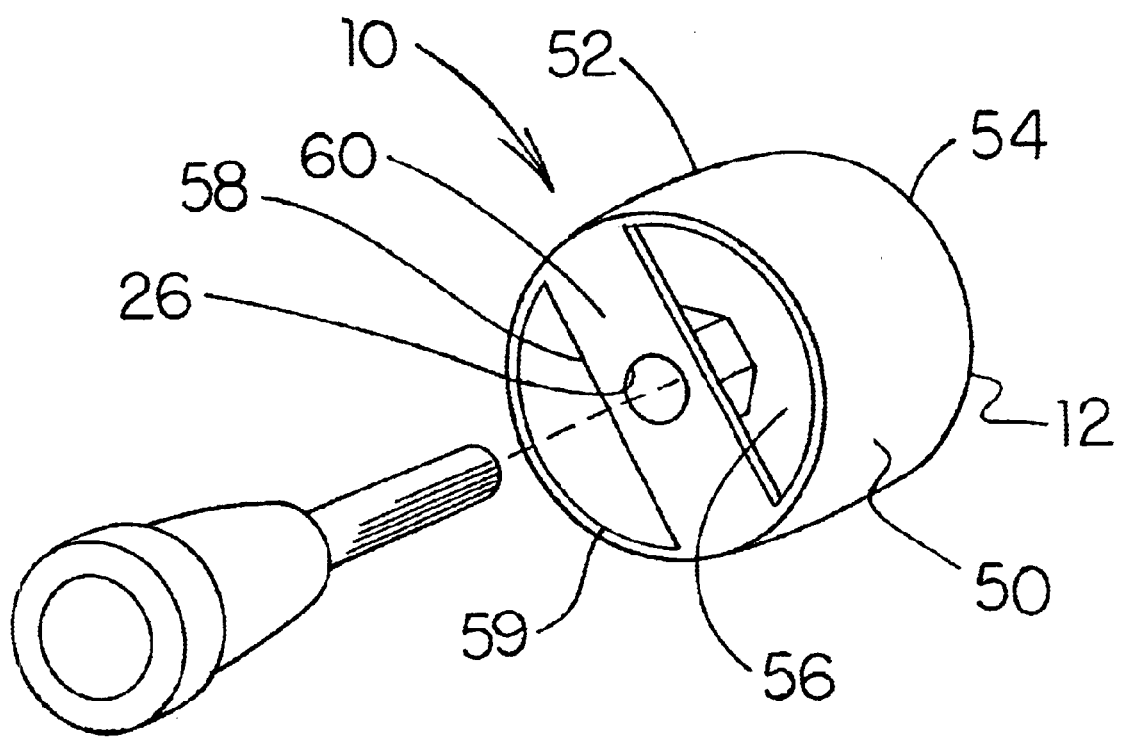
FIG. 7 is a perspective view of another version of the new and improved practice appliance of the invention.

Referring now to FIG. 7, another version 50 of the new and improved practice appliance of the invention is shown. Appliance 50 has a reflector 12 at one end 54, upstanding sides 52 which define an opening 56 at the other end 59. Extending across opening 56 is a bar 58 having an opening 26 therein. Secured to the bar 58 is a mouthpiece mount 60 that has a cylindrical bore therein (not shown) coaxial with the opening 26 which is of the same diameter as opening 26 and extends through the mouthpiece mount 60.

In various embodiments of the appliance 50, the upstanding side walls 52 may have an axial dimension which varies from a very small dimension to a dimension which is larger than the radius or transverse dimension of the reflector 12. Additionally, the appliance 50 may be molded of plastic or machined of other rigid materials, for example, stainless steel. As indicated above, the reflector 12 may either define a spherical surface, a parabolic surface or other curved surface as may be desired. In still other embodiments, the wall 52 and the opening 56 in cross-section may be of different cross-sectional shapes from parallelogram such as squares through multi-sided figures such as hexagons, pentagons, and the like, or of circular geometry as shown in FIG. 7. In specific embodiments, the wall thickness of upstanding walls 52 may vary in dimension, depending upon the acoustical properties of the material from which the appliance 50 is made.

In operation, the new and improved practice appliances 10 and 50 of the invention is held in one's hand by the reflector 12. The reflector 12 basically molds into the palm of the hand and the mouthpiece mount 14, 58 extends outwardly therefrom. The mouthpiece on which practice is desired is inserted into the opening 26 of the mouthpiece mount 14, 58 and frictionally secured thereto. The mouthpiece is secured by this means to the practice appliance outwardly of the focus 24 of the reflector 12.

The practice can now begin. The practice may consist of scales particular tonguing, or entire pieces. During the practice, the mouthpiece creates a buzzing noise which is reflected by the reflector back to the person practicing in an amplified state. By amplification, the practice appliance is useful even in the automobile when road noise may obliterate some conversation. The practice appliance is also fully available for use in other noisy atmospheres. By the practice appliance, a musician may practice as well with the appliance as if the instrument were present. Accomplished musicians may read the buzzing noise returned to him by the reflector to even indicate whether the note was hit on "the button" in tune or "under scooped" or "over scooped" as the case may be.

Once the practice is over, the mouthpiece may be removed from the mouthpiece mount 14 and stored in the practice appliance 10. The mouthpiece may be stored either between the reflector 12 and the mount 14 with the support arms 30 holding the mouthpiece to the reflector 12 as shown in FIG. 4. In another embodiment, the mouthpiece may be held between the support arms 30 between the reflector 12 and the mount 14 as shown in FIGS. 5 and 6.

The new and improved practice appliance 10, 50 of the invention provides a practice appliance for brass players that is relatively small and capable of being handheld that amplifies the buzz of the mouthpiece such that tonal quality and tonguing can be easily heard and practiced. The appliance is small enough and light weight enough to be carried in a pocket of one's clothing and provides means by which the mouthpiece can be stored with the appliance. The new and improved practice appliance of the invention is relatively inexpensive to manufacture and convenient to use.

While a specific embodiment of the invention has been shown and described herein for purposes of illustration, the protection afforded by any patent which may issue upon this application is not strictly limited to the disclosed embodiments; but rather extends to all structures and arrangements which fall fairly within the scope of the claims which are appended hereto.

What is claimed is:

1. A practice appliance for brass players comprising a sound reflector and a mouthpiece mount, said mouthpiece mount being secured to said reflector to position a mouthpiece outwardly of a focus of said reflector.

2. The practice appliance of claim 1 wherein said sound reflector has a reflecting surface that is a part spherical in shape.

3. The practice appliance of claim 2 wherein said mouthpiece is between said focus and a center of rotation of said surface.

4. The practice appliance of claim 1 wherein said sound reflector is concave.

5. The practice appliance of claim 1 wherein said sound reflector is parabolic.

6. The practice appliance of claim 1 wherein said reflector is resiliently flexible.

7. The practice appliance of claim 6 wherein said mouthpiece mount is supported by a plurality of flexible arms extending between said reflector and said mouthpiece mount.

8. The practice appliance of claim 7 wherein said flexible arms are each secured to said mouthpiece mount at one end thereof and secured to said reflector at an opposite end thereof to spaced apart, opposite portions of a periphery of said sound reflector.

9. The practice appliance of claim 8 wherein said sound reflector is resiliently flexible and movable from a collapsed condition in which said plurality of flexible arms are collapsed to an extended position in which said sound reflector holds said flexible arms in an extended at rest position.

10. The practice appliance of claim 8 wherein said mouthpiece is storable between said reflector and said flexible arms, said flexible aims holding said mouthpiece against said reflector.

11. The practice appliance of claim 1 wherein said mouthpiece mount has a hole therein in which said mouthpiece is frictionally securable.

12. The practice appliance of claim 1 wherein said sound reflector is rectangular in shape.

13. The practice appliance of claim 1 wherein said reflector is rigid, said mouthpiece is supported by a plurality of rigid arms extending between said reflector and said mouthpiece.

14. The practice appliance of claim 13 wherein said arms are spaced from said reflector a distance which allows said mouthpiece to be frictionally held between said reflector and said arms.

15. A practice appliance for brass players comprising a sound reflector and a mouthpiece mount, said reflector having a reflecting surface, said mouthpiece mount being secured to said reflector to position a mouthpiece outwardly of a focus of said reflector with a lip engaging portion of said mouthpiece outwardly of said mount and an opposite end of said mouthpiece between said focus and a center of rotation of said surface.

16. The practice appliance of claim 15 further comprising a wall portion extending between said sound reflector and said mouthpiece mount, said wall portion having an axial length from about one to about two times a transverse direction of said sound reflector.

17. A practice appliance for brass players comprising a sound reflector and a mouthpiece mount, said mouthpiece mount being secured to said reflector to position a mouthpiece outwardly of a focus of said reflector with a lip engaging portion of said mouthpiece outwardly of said mount and an opposite end of said mouthpiece, said sound reflector being concave.

18. A practice appliance for brass players comprising a sound reflector and a mouthpiece mount, said mouthpiece mount being secured to said reflector to position a mouthpiece outwardly of a focus of said reflector with a lip engaging portion of said mouthpiece outwardly of said mount and an opposite end of said mouthpiece, said mouthpiece mount having a hole therein in which said mouthpiece is positionable, said sound reflector being concave.

19. A practice appliance for brass players comprising a sound reflector and a mouthpiece mount, said mouthpiece mount being secured to said reflector to position a mouthpiece outwardly of a focus of said reflector with a lip engaging portion of said mouthpiece outwardly of said mount and an opposite end of said mouthpiece, said sound reflector being concave, said mouthpiece mount being supported by a plurality of flexible arms extending between said reflector and said mouthpiece mount, said sound reflector being resiliently flexible and movable from a collapsed condition in which said plurality of flexible arms are collapsed to an extended position in which said sound reflector holds said flexible arms in an extended at rest position.

20. A practice appliance for brass players comprising a sound reflector and a mouthpiece mount, said mouthpiece mount being secured to said reflector to position a mouthpiece outwardly of a focus of said reflector with a lip engaging portion of said mouthpiece outwardly of said mount and an opposite end of said mouthpiece, said sound reflector being concave, said mouthpiece mount being supported by a plurality of flexible arms extending between said reflector and said mouthpiece mount, said sound reflector being resiliently flexible and movable from a collapsed condition in which said plurality of flexible arms are collapsed to an extended position in which said sound reflector holds said flexible arms in an extended at rest position, said mouthpiece being stored between said reflector and said flexible arms, said flexible arms holding said mouthpiece against said reflector.

21. A practice appliance for brass players comprising a sound reflector and a mouthpiece mount, said sound reflector having a reflecting surface, said mouthpiece mount being secured to said reflector to position a mouthpiece outwardly of a focus of said reflector, said mouthpiece being between said focus and a center of rotation of said surface, said sound reflector being concave, said reflector being rigid, said mouthpiece being supported by a plurality of rigid arms extending between said reflector and said mouthpiece, said arms being spaced from said reflector a distance which allows said mouthpiece to be frictionally held between said reflector and said arms.

* * * * *